United States Patent [19]
Walker, Jr.

[11] Patent Number: 5,122,012
[45] Date of Patent: Jun. 16, 1992

[54] METHOD FOR IMPROVING THE CHARACTERISTICS OF SULFATE BEARING SOILS

[75] Inventor: Daniel D. Walker, Jr., Henderson, Nev.

[73] Assignee: Chemical Lime Company, Fort Worth, Tex.

[21] Appl. No.: 650,748

[22] Filed: Feb. 5, 1991

[51] Int. Cl.$^5$ .................. C09K 17/00; E02D 3/12
[52] U.S. Cl. .................. 405/263; 405/266; 106/900
[58] Field of Search .......... 405/128, 129, 263, 264, 405/265, 266; 106/900

[56] References Cited

U.S. PATENT DOCUMENTS

| | | | |
|---|---|---|---|
| 2,916,853 | 12/1959 | Latourette | 405/264 X |
| 3,635,742 | 1/1972 | Fujimasu | 405/264 X |
| 3,741,308 | 6/1973 | Veley | 405/270 X |
| 4,329,090 | 5/1982 | Teague et al. | 405/263 |

FOREIGN PATENT DOCUMENTS

| | | | |
|---|---|---|---|
| 0143288 | 11/1981 | Japan | 106/900 |
| 61-87776 | 5/1986 | Japan | 405/263 |
| 61-91283 | 5/1986 | Japan | 405/263 |

Primary Examiner—Dennis L. Taylor
Assistant Examiner—Arlen L. Olsen
Attorney, Agent, or Firm—Charles D. Gunter, Jr.

[57] ABSTRACT

A method is shown for reducing the swelling action of sulfates in clay bearing soils while increasing the bearing strength values of the soils by treating soils having high sulfate content with a barium containing compound in an amount effective to react with the sulfate present in the soils, thereby forming less soluble reaction products and decreasing the tendency of the soil to form ettringite. The soil is further stabilized by the application of lime.

5 Claims, 3 Drawing Sheets

METHOD FOR IMPROVING THE CHARACTERISTICS OF SULFATE BEARING SOILS

BACKGROUND OF THE INVENTION

1. Field of the Invention

The present invention relates generally to soil stabilization methods and to compositions for use therein and, specifically to a method for improving the characteristics of sulfate bearing soils by treating with barium compounds in conjunction with lime stabilization.

2. Description of the Prior Art

Pretreating building sites for improving the strength and volume change characteristics of the soil is a long known problem facing the civil and architectural engineer. There are many examples in the prior art of methods and materials used to stabilize soils, or to improve subgrades in the subsurface layers adjacent the surface of the earth for a variety of purposes. Thus, in the past, subgrades have been improved as building sites, streets, runways, railroads, for remedial stabilization of existing structures, slope stabilization and for landfill stabilization, to list several typical examples. Lime and lime slurries have been worked into the top layers of the earth; for example 6 to 36 inches in depth, to improve and stabilize soils or subgrades. Chemical soil stabilization by injection of lime slurry at predetermined depths below the soil surface is also known using slaked or hydrated lime.

Despite these advances in the art, a need continues to exist for a method for improving the characteristics of soils or subgrades, particularly those soils which have a high sulfate content making them subject to undesirable swell or expansion.

A need also exists for such a method which improves the bearing strength values of such soils to thereby build compressive strength in the subsurface layers.

A need exists for such a method which is simple and economical in practice and which is compatible with existing lime stabilization techniques.

SUMMARY OF THE INVENTION

The method of the invention reduces the swelling action of sulfates in clay bearing soils while increasing the bearing strength values of the soils. In the method of the invention, soils having a high sulfate content are treated by contacting the soils with a barium containing compound in an amount effective to react with sulfates present in the soils, thereby forming less soluble reaction products and decreasing the tendency of the soil constituents to form ettringite. The soils are also further stabilized by the application of lime to the soils. The preferred barium compounds used in conjunction with the lime stabilization treatment are selected from the group consisting of barium hydroxide, barium carbonate, barium salts, and mixtures thereof.

Additional objects, features and advantages will be apparent in the written description which follows.

DETAILED DESCRIPTION OF THE INVENTION

Figure 1:
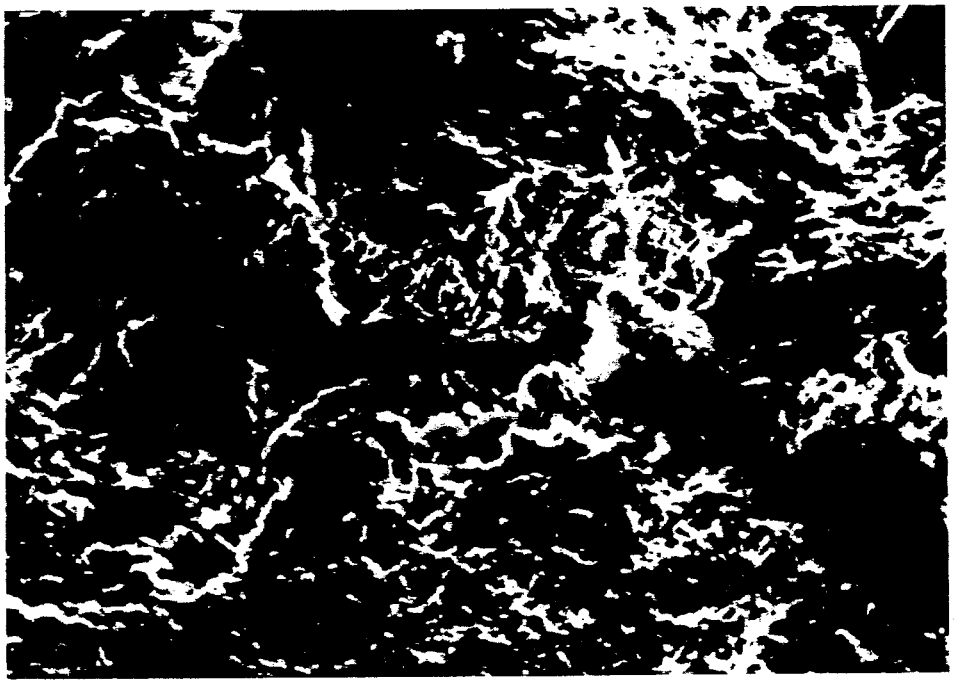
FIG. 1 is a view at 720X magnification of a California soil after double application of lime, 3% $Ca(OH)_2$ + 3% $Ca(OH)_2$, after a 60 day soaking period showing the presence of ettringite as lightened areas.

In spite of advances in lime (calcium hydroxide) soil stabilization techniques, it has been found that soluble sulfates, present in certain sulfate bearing soils, react with calcium hydroxide and free aluminum to form the water sensitive mineral ettringite ($3CaO.Al_2O_3.3CaSO_4.32H_2O$). Expansion due to the growth of ettringite in lime stabilized sulfate soils often produces severe problems, for instance, in the construction and performance of pavement foundation systems. The amount and type of sulfates present in the soil, namely sodium sulfate and/or calcium sulfate, and the amount and type of clay material present are properties which play key roles in the post-stabilization expansion developed over time in lime treated sulfate soils. The formation of ettringite is also known to be responsible for the deterioration of concrete by sulfate attack.

Because the quantity of sulfates present generally dictates the extent to which ettringite will form, it is important to evaluate sulfate content in soils intended for construction purposes. Simply stated, the greater the content of soluble sulfates in a soil, the greater the potential for the growth of ettringite.

In the method of the invention, sulfate bearing soils are treated with barium containing compounds in conjunction with a lime stabilization treatment. The method can conveniently be carried out by pretreating the soils with barium containing compounds. Thereafter, the soils are further stabilized by the application of lime to the soils. The effectiveness of pretreatment with barium containing compounds is affected by a number of factors, to be discussed.

The fact that sodium sulfate and calcium sulfate (gypsum) have different solubilities suggests that the form of sulfates present in a soil plays an active role in the degree to which ettringite will form. Gypsum is approximately 100 times less soluble than other sulfate minerals normally found in soils. Calcium and sodium sulfate commonly form evaporite minerals in arid to semiarid regions, due to little or no leaching, crystallizing when their concentrations exceed their solubility limits. Gypsum is the most common sulfate mineral found in soils due to its relatively low solubility.

The percentage and type of clay minerals present in a soil generally dictates the amount of lime required to stabilize the soil. Soils with a high clay content or an initial high plasticity index (PI) and swell, require greater amounts of lime to effectively reduce the plasticity, eliminate the swell, and stabilize the soil. However, the addition of lime to a sulfate bearing soil provides calcium which reacts with the sulfates to form gypsum, which may react with aluminum to form ettringite.

The type or types of clay present are also believed to be major factors in determining the strength and swell potential in lime stabilization. Smectites are three layered clays which are highly expansive. Thus, a soil containing large amounts of smectite will require more lime to become stabilized. However, the two layered structure of kaolinite may allow it to be a greater source of aluminum needed for the formation of ettringite in sulfate bearing soils.

The tests which follow were conducted to determine if reactions that form ettringite could be minimized in sulfate bearing soils by pretreating them with barium containing compounds in an effort to reduce the soluble sulfates prior to lime stabilization. Barium compounds, including barium hydroxide barium carbonate and salts of barium, e.g., barium chloride, react to form less soluble barium sulfates, thereby reducing the availability of soluble sulfates for ettringite formation. Another method involving a double lime treatment of sulfate soils is also included for comparison as a method to reduce detrimental sulfate reactions.

Three soils are included in the tests which follow, the soils being selected because of their high sulfate content and expansive nature. Soils from Orange County, Calif., Central Texas, and Denver, Colo. were utilized in various aspects of the testing procedures. The soils vary in composition and content of sulfates, the amount and type of clay components, swell, and plasticity. The lime used in all tests was a calcium hydroxide ($Ca(OH)_2$) obtained through Fisher Scientific Corporation.

Initial properties that influence lime stabilization were determined by analyzing the untreated soil samples. Soil mineral compositions were determined using X-ray diffraction (XRD) procedures, and microscopic techniques. Clay percentages were determined using a standard hydrometer test (ASMT D 422). The plasticity indices were determined by a standard Atterberg limits test. These tests will be familiar to those skilled in the art.

The optimum water contents for compaction of the soils were determined by a modified Proctor density test (ASMT D 698). The soils were then compacted, using a standard California Bearing Ratio (CBR) method (ASMT D 1557), into 6-inch diameter molds at their optimum water contents and soaked in water for periods of 4, 14, 40, and 60 days. After the respective soaking periods the compacted soils were measured for percent swell and tested to determine bearing strength values.

Three types of treatment methods were conducted on the soils. Untreated soils and soils treated with 6 percent lime were tested for swell and strength values after 4-day soaking periods.

A double application of lime was conducted where 3 percent lime was added followed by an uncompacted wet curing period of 7 days prior to the application of an additional 3 percent lime before compaction. The samples were then soaked for 60 days before being tested for swell and strength characteristics.

In the barium compound treatment method, soils were pretreated with 3 percent barium hydroxide or 3 percent barium chloride, compacted at their optimum water contents, soaked in water for 14 days, and tested for strength and swell values. The soils were then dried at 50° C., disaggregated, treated with 6 percent lime, compacted at their optimum water contents, and soaked for periods of 14 and 40 days before being tested for strength and swell values.

In order to determine Potential Volume Change (PVC) properties of the soils, the soils were compacted into 2.75 inch molds at their plastic limits and at 2.5 times standard Proctor compactive efforts. The samples were measured for swell pressures exerted against the restraining force of a proving ring over periods of 7 days using a PVC meter. The meter was used to perform swell index tests to determine the expansive nature of a soil and to give it a rating of either non-critical, marginal, critical, or very critical, depending on the amount of swell that is developed.

Two soil treatment methods were investigated in the PVC testing. In the first method, 6 percent lime was added to each soil, followed by mixing, compacting, and monitoring of swell pressures developed during 7day soaking periods.

In the second method, 3 percent barium hydroxide or 3 percent barium chloride were added to each soil, followed by wet curing for 7 days, and drying at 50° C. They were then disaggregated, treated with 6 percent lime, compacted, and monitored for swell pressures developed during 7-day soaking periods.

Tables 1 and 2 which follow illustrate several of the initial properties of soils which influence lime stabilization and control the behavior of sulfate soils. These properties are the soluble sulfates content, clay percentage, and plasticity index (Table 1), and soil mineral composition (Table 2). The Texas and Colorado soil properties are very similar except that the Colorado soil contains slightly higher soluble sulfates and clay percentage. The California soil has a similar soil mineral composition as the Texas and Colorado soil but the soluble sulfates content and clay percentage are much lower.

TABLE 1

| | Initial soil properties | | |
|---|---|---|---|
| SOIL TYPE | SOLUBLE SULFATES (ppm) | CLAY % | PI |
| Texas | 8,870 | 67 | 41 |
| California | 3,850 | 27 | 13 |
| Colorado | 10,000 | 80 | 44 |

TABLE 2

| | Original soil mineral composition |
|---|---|
| SOIL TYPE | MINERAL COMPOSITION |
| Texas | Smectite, Illite, Kaolinite, Gypsum, Quartz |
| California | Smectite, Illite, Kaolinite, Gypsum, Quartz |
| Colorado | Smectite, Illite, Kaolinite, Gypsum, Quartz |

As shown in Table 3, testing after a 4-day soaking period showed an increase in CBR values and a decrease in percent swell for both soils when 6 percent lime was added compared to the untreated soils. Testing after a 14-day soaking period of soils pretreated with the two barium compounds showed an increase in CBR values with the addition of lime to the pretreated soils. (Table 4). The barium hydroxide plus lime mix appeared to control the swell more effectively than the barium chloride plus lime mix in the Texas soil. Comparing this data to tests previously conducted using lime only and untreated samples (Table 3), the barium hydroxide plus lime mix showed a marked increase in CBR values for both soils and a decrease in percent swell for Texas soil. Percent swell for the California soil may be considered negligible in all cases. The barium chloride plus lime mix showed increased CBR values for the California soil but little to no improvement in CBR values or percent swell for the Texas soil. The California soil was retested using an extended soaking period of 40 days. Both barium compounds were utilized and it was shown that CBR values increased (Table 5) over that of the previous 14-day soaking test.

TABLE 3

Results of CBR tests with 4-day soaking periods

| | TREATMENT | | | |
|---|---|---|---|---|
| | 6% Ca(OH)$_2$ | | Untreated | |
| SOIL TYPE | CBR | % Swell | CBR | % Swell |
| Texas | 5.1 | 5.7 | 0.7 | 12.0 |
| California | 10.4 | 0.02 | 4.2 | 0.7 |

TABLE 4

Results of CBR tests with 14-day soaking periods

| | TREATMENT | | | |
|---|---|---|---|---|
| SOIL TYPE | CBR | % Swell | CBR | % Swell |
| | 3% Ba(OH)$_2$ | | 3% Ba(OH)$_2$ + 6% Ca(OH)$_2$ | |
| Texas | 3.5 | 1.9 | 21.2 | 3.2 |
| California | 5.1 | 0.24 | 20.6 | 0.17 |
| | 3% Ba(Cl)$_2$ | | 3% Ba(Cl)$_2$ + 6% Ca(OH)$_2$ | |
| Texas | — | — | 4.3 | 11.6 |
| California | 3.2 | 1.5 | 24.8 | 0.08 |

TABLE 5

Results of CBR tests with 40-day soaking periods

| | TREATMENT | | | |
|---|---|---|---|---|
| | 3% Ba(OH)$_2$ + 6% Ca(OH)$_2$ | | 3% Ba(Cl)$_2$ + 6% Ca(OH)$_2$ | |
| SOIL TYPE | CBR | % Swell | CBR | % Swell |
| California | 48.7 | −.24 | 36.9 | −.06 |

The double application of lime utilizing the California and Texas soils proved to be relatively successful (Table 6). The results were somewhat improved over the barium chloride plus lime mix but proved not to be as successful as the barium hydroxide plus lime mix.

TABLE 6

Results of CBR tests with 60 day soaking periods

| | TREATMENT | |
|---|---|---|
| | Double Application of Lime (3% + 3%) | |
| SOIL TYPE | CBR | % Swell |
| Texas | 21.5 | 5.0 |
| California | 45.7 | 0.65 |

Testing of the Texas and Colorado soils using the PVC meter for Potential Volume Change confirmed the CBR test results. For both soils, the barium hydroxide plus lime mix showed a significant decrease in swell pressure compared to that of lime treatment only. The barium chloride plus lime mix exhibited some improvement over the lime only mix but was not as significant as the barium hydroxide plus lime mix (Table 7).

TABLE 7

Results of PVC tests with 7-day soaking periods

| | Pressure exerted lb./sq. ft. | |
|---|---|---|
| TREATMENT | Texas soil | Colorado soil |
| 6% Ca(OH)$_2$ | 7,600 | 5,400 |
| 3% Ba(Cl)$_2$ + 6% Ca(OH)$_2$ | 3,700 | 1,900 |

TABLE 7-continued

Results of PVC tests with 7-day soaking periods

| | Pressure exerted lb./sq. ft. | |
|---|---|---|
| TREATMENT | Texas soil | Colorado soil |
| 3% Ba(OH)$_2$ + 6% Ca(OH)$_2$ | 1,000 | 700 |

Figure 2:
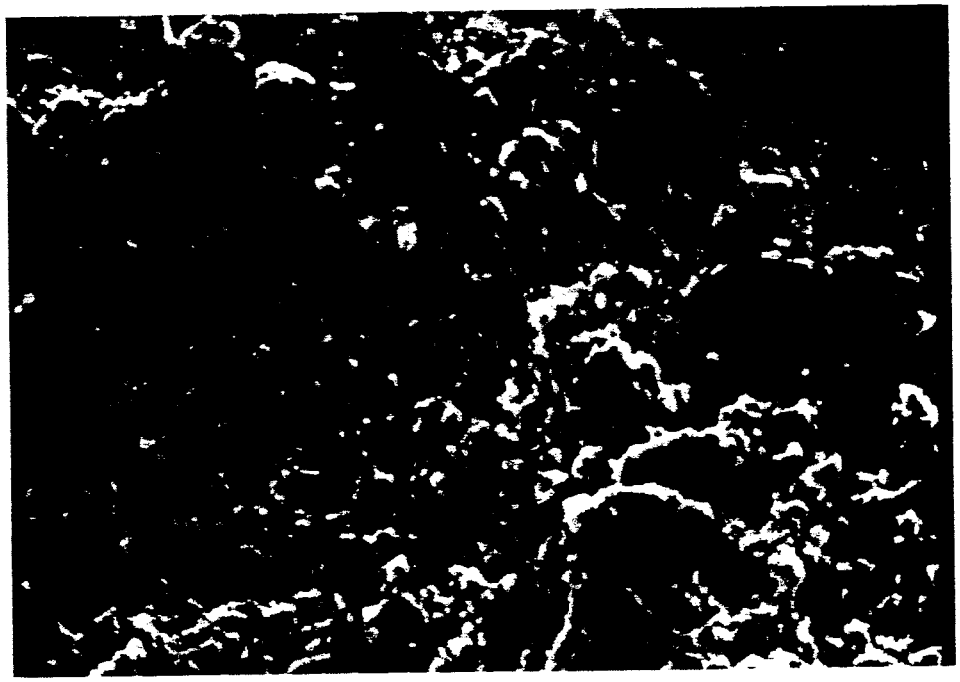
FIG. 2 is a view at 1050X magnification of a California soil treated with 3% $Ba(OH)_2$ + 6% $Ca(OH)_2$ after a 14 day soaking period.
Figure 3:
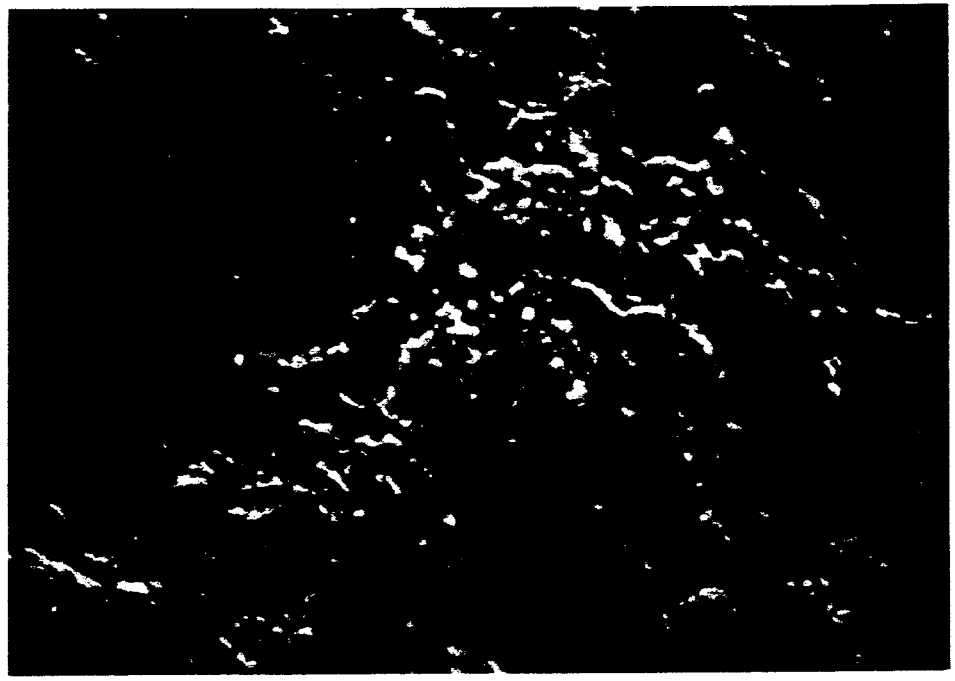
FIG. 3 is a view at 1150X magnification of a California soil treated with 3% $Ba(Cl)_2$ + 6% $Ca(OH)_2$ after a 14 day soaking period.
Figure 4:
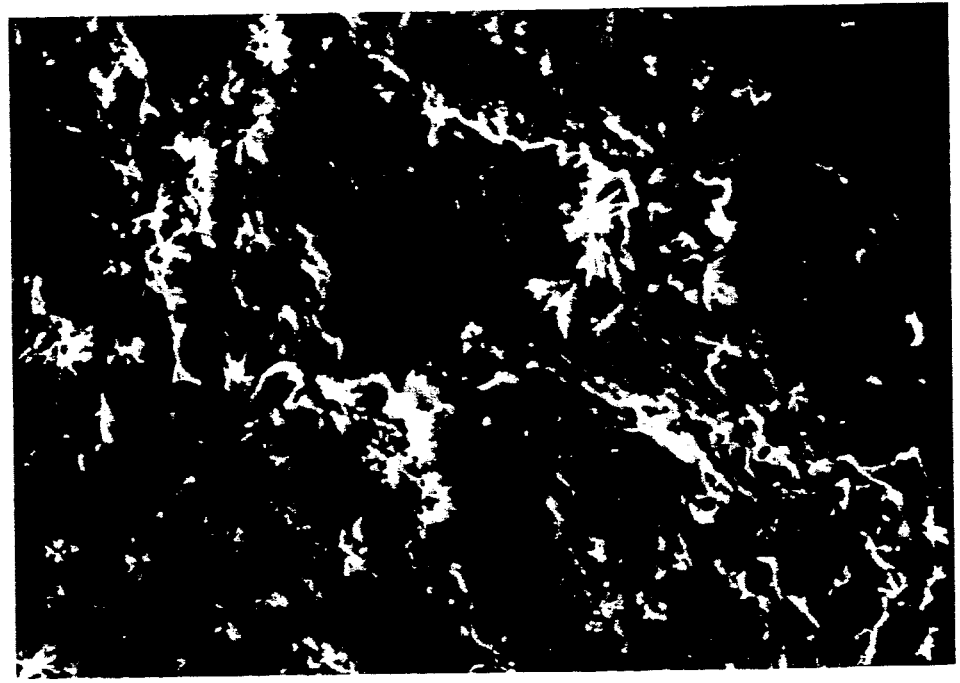
FIG. 4 is a veiw at 790X magnification of a Texas soil treated with 3% $Ba(Cl)_2$ + 6% $Ca(OH)_2$ after a 14 day soaking period.
Figure 5:
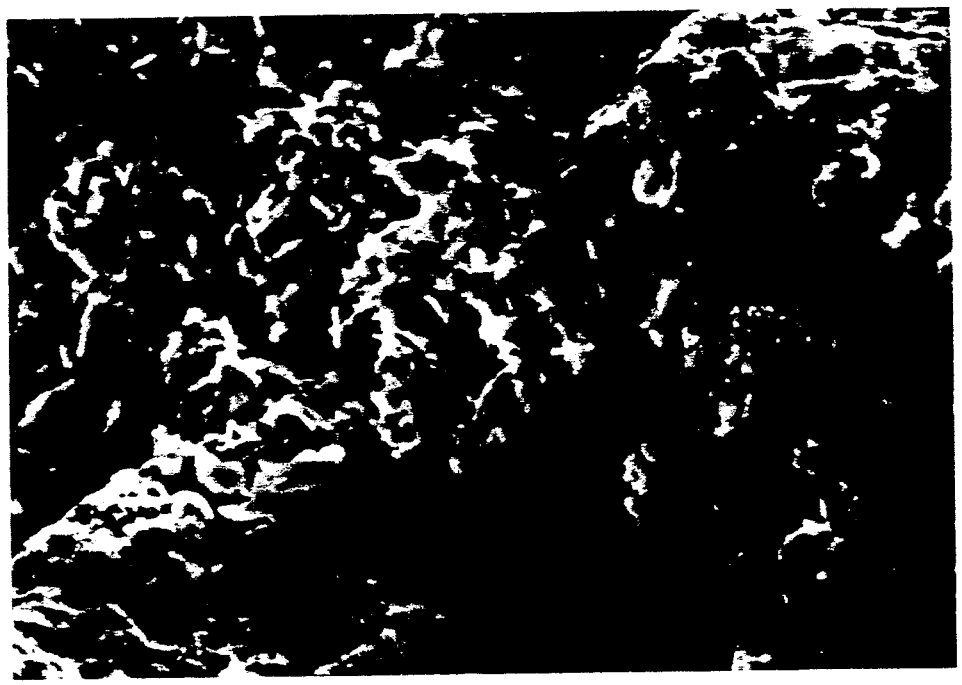
FIG. 5 is a view at 1550X magnification of a Texas soil treated with 3% $Ba(OH)_2$ + 6% $Ca(OH)_2$ after a 14 day soaking period.

Samples were taken from the 14-day-soak soils pretreated with the two barium compounds and analyzed using a Scanning Electron Microscope (SEM) to determine if the formation of ettringite was being controlled. The California soil treated with the double application of lime showed an abundance of ettringite, an elongated, needlelike mineral (FIG. 1), as did the Texas soil. Ettringite was not detected in the California soil treated with either the barium chloride or barium hydroxide plus lime mix (FIGS. 2 and 3). In the Texas soil, ettringite was found to be relatively abundant in the barium chloride and lime mix (FIG. 4) and was present, but sparse, in the barium hydroxide and lime mix (FIG. 5). Even though ettringite was seen in some treated samples using the SEM, it was not detected using XRD procedures.

In actual practice, it will be understood that the barium containing compounds can be applied to the soils in a number of ways, such as simple mixing of the dry compound with the soil; mixing followed by the addition of water to the soil; adding a solution of the soluble salt to the soils, by combining the soluble salt with a slurry of lime or combining the dry compound with dry lime, etc.

An invention has been provided with several advantages. The pretreatment of sulfate soils with barium compounds prior to lime application was successful in preventing unwanted swell or expansion and in increasing bearing strengths of the soils tested. The most successful tests were with the California soil. In these soils, the formation of ettringite was deterred and strength values were increased using both barium compounds. This may be due to the soils relatively low soluble sulfate content, low clay content, and low plasticity. The Texas soil which has a higher soluble sulfate content, greater clay content, and is more plastic, showed improvement in strength and swell values for the barium hydroxide pretreatment, but no improvement was seen with the barium chloride pretreatment. The higher content of sulfates in the Texas soil is thought to be the reason for the formation of ettringite despite pretreatment methods. The barium ions are believed to be more available in the barium hydroxide plus lime mix than in the barium chloride plus lime mix.

The increase in CBR values observed for the 40-day soaking period in the California soil can be attributed to cementitious effects of lime forming calcium silicate hydrates and calcium aluminate hydrates through dissolution of Si and Al in the clay mineral structures. This accounts for strength improvement over time which has been demonstrated in other lime treated soils. The barium compounds used in the method of the invention react with the sulfates, forming less soluble barium sulfates, leaving a lesser amount of sulfates available to react with calcium hydroxide and aluminum to form ettringite. Reduction of ettringite formation leaves more free lime, keeping the pH above 12.4, allowing for more dissolution of the clay fraction to produce additional cementing materials during lime stabilization.

Lime added to barium hydroxide treated soils reduced swell pressures in volume change tests, keeping the swell in the "non-critical" range. The lime only treatment rated in the "critical" category of soil expansion. Lime added to barium chloride treated soils controlled the swell to some degree and rated as "marginal" swell.

While the invention has been shown in only one of its forms, it is not thus limited but is susceptible to various changes and modifications without departing from the spirit thereof.

I claim:

1. An improved method for reducing the swelling action of soluble sulfates present in clay bearing soils while increasing the bearing strength values of the soils, the method comprising the steps of:

first, incorporating into the soils a barium containing compound in an amount effective to react with soluble sulfates present in the soils, thereby forming barium sulfates as less soluble reaction products; and then, further stabilizing the soils by the application of lime to the soils.

2. The method of claim 1, wherein the barium compound is selected from the group consisting of barium carbonate, barium hydroxide and salts of barium.

3. An improved method for reducing the swelling action of soluble sulfates in clay bearing soils while increasing the bearing strength values of the soils, the method comprising the steps of:

in a first step, pretreating soils having a high content of soluble sulfates with a barium containing compound in an amount effective to react with the soluble sulfates present in the soils by applying the barium containing compound to the soils, thereby forming barium sulfates as less soluble reaction products and decreasing the tendency of the soil to form ettrigite;

thereafter, in a second step, further stabilizing the soils by the application of lime to the soils.

4. The method of claim 3, wherein the barium compound is selected from the group consisting of barium hydroxide, barium chloride and barium carbonate.

5. The method of claim 4, wherein the lime is provided in the form of calcium hydroxide.

* * * * *